United States Patent
Kiley

Patent Number: 5,912,568
Date of Patent: Jun. 15, 1999

[54] LED DRIVE CIRCUIT

[75] Inventor: David A. Kiley, Howell, N.J.

[73] Assignee: Lucent Technologies Inc., Murray Hill, N.J.

[21] Appl. No.: 08/821,896

[22] Filed: Mar. 21, 1997

[51] Int. Cl.$^6$ ................................................. H01L 31/00
[52] U.S. Cl. .......................................... 327/108; 327/515
[58] Field of Search ................................. 327/108, 109, 327/110, 111, 112, 530, 534, 535, 538, 542, 514, 515; 362/24, 88, 800

[56] References Cited

U.S. PATENT DOCUMENTS

| | | |
|---|---|---|
| 4,104,533 | 8/1978 | Iverson ........................................ 250/551 |
| 4,752,693 | 6/1988 | Nagano ....................................... 250/551 |
| 5,765,940 | 6/1998 | Levy et al. .................................. 362/240 |

*Primary Examiner*—Timothy P. Callahan
*Assistant Examiner*—Jeffrey Zweizig

[57] ABSTRACT

An LED drive circuit comprising a plurality of LEDs coupled together in parallel, the LEDs configured to be powered by a battery. A current source coupled to the LEDs provides a current signal level for driving the LEDs. A current sensor circuit is coupled to the current source and is configured to provide a first indication signal in response to the current signal flowing in the LEDs. A controller circuit is coupled to the current sensor so as to receive the indication signal. The controller circuit is further coupled to the current source so as to provide an appropriate control signal to the current source so that the current drawn through the LEDs remains substantially at a desired level.

16 Claims, 4 Drawing Sheets

LED DRIVE CIRCUIT

FIELD OF THE INVENTION

This invention relates to a light emitting diode "LED" drive circuit and more specifically to a microprocessor controlled LED employed in cellular telephones and personal communications "PC" terminals.

BACKGROUND OF THE INVENTION

The keypad in cellular phones or PCS terminals is typically illuminated by light emitting diodes "LEDs," which emanate light in response to a current flow. Many other electronic devices also employ such LEDs for illumination purposes. In many instances these LEDs are employed in a battery-operated device. For example, cellular phones or PCS terminals are typically driven by a battery pack that provides a voltage signal level, $V_{BAT}$, ranging around 4–6 volts, depending on the charge state of the battery pack.

A light emitting diode typically maintains a potential drop of about 2 volts across its terminal. The brightness of the LED depends on the current flow through it. Typically, a 10 mA current flow allows for an acceptable brightness level. Thus, many prior art systems employ few LEDs connected in parallel and powered by a battery pack voltage level, such as 4–6 volts. A typical PCS terminal or a cellular phone such as 30, illustrated in FIG. 2, requires up to 8 LEDs for proper brightness across all keys 36 and display screen 32. As a result, these prior art systems employ 8 branches of LEDs each drawing approximately 10 mA of current, leading to a total current discharge of about 80 mA. For a battery driven system, such a level of current discharge may lead to a shorter usage time between periodic charging of the battery.

In order to conserve battery power, other prior art systems, such as 10, employ two LEDs connected in series in each branch, as illustrated in FIG. 1. For example, as illustrated, eight LEDs are employed in four branches. The total current drain for the system illustrated in FIG. 1 is about 40 mA, which is half the amount of current drain of single-LED-per-branch systems. A battery pack 12 is coupled to four branches of LEDs such as 18 and 20, through a control resistor 16. A switch 22 is employed to activate the LEDs in each branch. The amount of current drawn in each branch depends on the value of resistor 16 and voltage fluctuations across battery pack 12. However, since there are now two LEDs coupled in series in each branch, the voltage drop across each branch is about 4 volts in addition to the voltage drop across switch 22, which is about 0.2 volts. The voltage drop across resistor 16 is the difference between the voltage level at the battery pack and the voltage level at each branch.

A shortcoming with this arrangement is that small voltage fluctuations at the battery pack may lead to relatively large current fluctuations across each branch. For example, as soon as the voltage level at the battery pack begins to decrease, the change in the LEDs' brightness may be noticed. Another disadvantage with the prior art LED drivers is that in cellular phones or PCS terminals, during a standby mode the battery voltage level is higher than during the talk mode. Thus, as soon as a call is received, the battery voltage level drops leading to a significant drop in the LED currents, resulting in a noticeable change in brightness. Another disadvantage is variations in the parameters of the switch, which usually comprises a switching transistor. Variations in temperature and transistor characteristics may lead to variations in voltage drop across the transistor, leading in further current fluctuations.

A further disadvantage is particularly prevalent in time division multiple access "TDMA" systems, where the cellular phone transmits signals at appropriate time slots. During such signal transmission, the battery voltage level drops, leading to significant current fluctuations across the LEDs, resulting in LED flickering.

Thus, there is a need for an LED drive circuit in a battery operated system, that is capable of maintaining a constant current flow through the LEDs for a wide range of power supply voltage signal levels.

SUMMARY OF THE INVENTION

In accordance with one embodiment of the invention, an LED drive circuit comprises a voltage control current source coupled to at least two serially coupled LEDs. The current source provides a first indication signal in response to the current signal flowing in the LEDs. A controller circuit receives the indication signal and provides an appropriate control signal to the voltage controlled current source so that the current drawn through the LEDs remains substantially constant.

In accordance with another embodiment of the invention, an LED drive system in a microprocessor controlled device comprises, a plurality of LED branches coupled in parallel, each branch including a plurality of serially coupled LEDs. A variable current source coupled to the LED branches, provides an indication signal in response to the current drawn in each branch. The microprocessor receives the indication signal and generates a pulse width modulated signal in response to the indication signal. The pulse width modulated signal is coupled to the variable current source via a filter circuit. The current source generates a substantially constant current in response to the pulse width modulated signal.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE INVENTION

Figure 1:
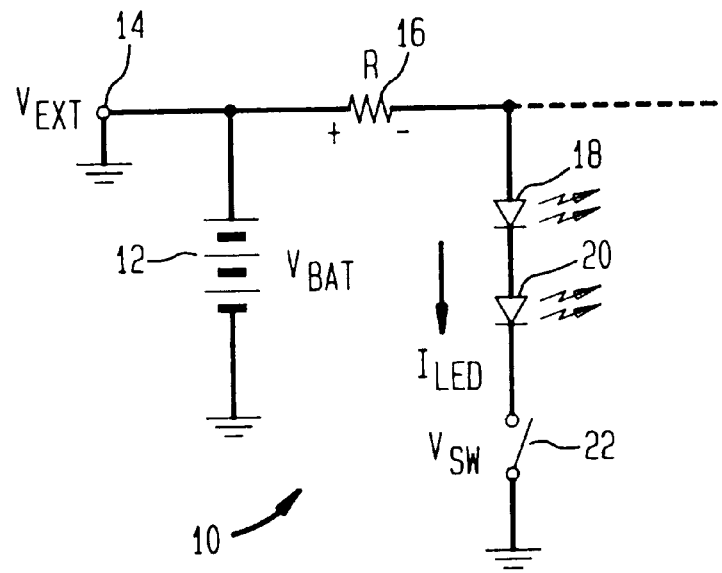
FIG. 1 illustrates a prior art LED drive circuit including a battery pack providing a current via a resistor to serially coupled LEDs.
Figure 2:
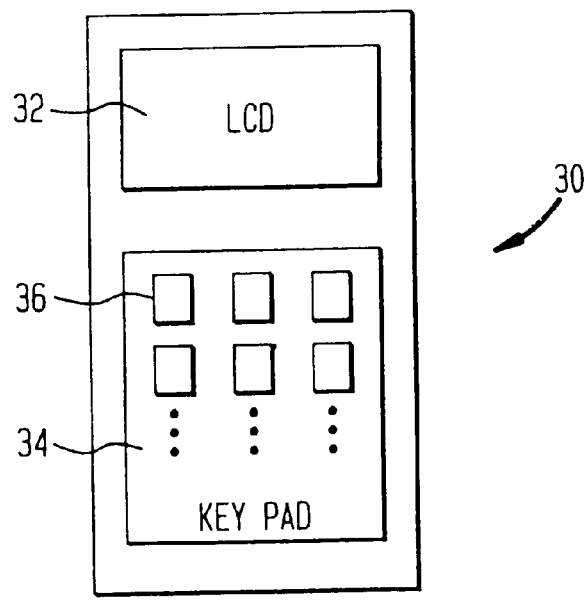
FIG. 2 illustrates a keyboard such as one employed by a cellular phone having transparent keys which are illuminated by LEDs in accordance with one aspect of the present invention.
Figure 3:
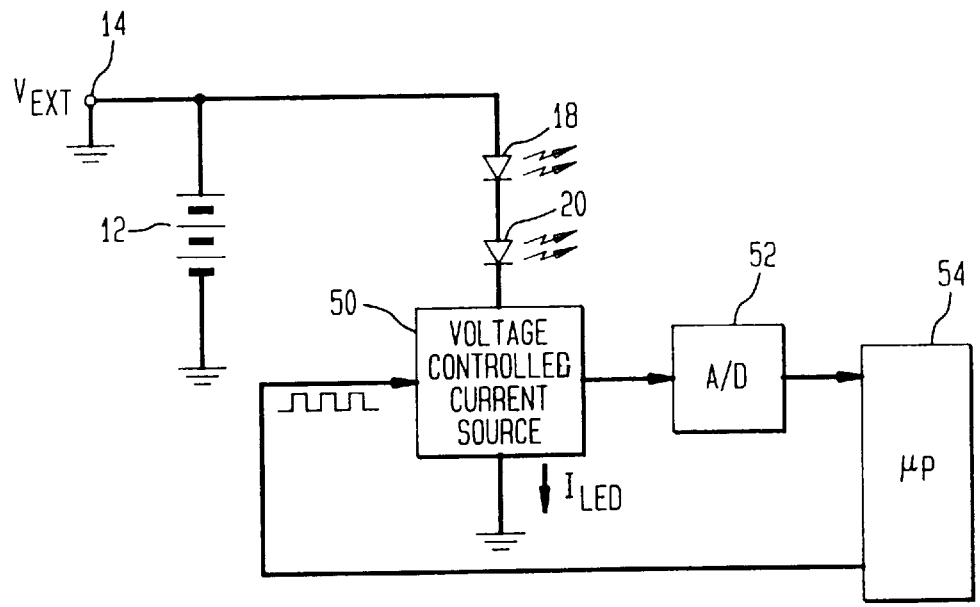
FIG. 3 illustrates a block diagram of an LED drive circuit in accordance with one embodiment of the present invention.

FIG. 3 illustrates an LED drive system, such as 10, employed in a microprocessor controlled device, although the invention is not limited in that respect. For example, other control circuits may be implemented to provide the same control unctions such as those provided by the microprocessor.

Two LEDs, such as 18 and 20 are serially coupled together to form one of the LED branches of system 10. It is noted that a plurality of such branches may be connected together in parallel. The anode terminals of the first LEDs in each branch are coupled together and to an output terminal of a battery pack 12. The cathode terminals of the last LEDs in each branch are coupled together and to a voltage controlled current source 50. The output terminal of voltage controlled current source 50 is coupled to an input terminal of an analog-to-digital "A/D" converter 52, which in turn provides a digital signal intended to be stored in a specially allocated register in microprocessor 54.

In one embodiment of the present invention, microprocessor 54 is selected from one of the commercially available processors, such as Motorola MC68HC11CO. An output terminal of microprocessor 54, such as a PWM timer output terminal, is coupled to an input terminal of voltage-controlled current source 50. PWM timer output terminal provides a pulse width modulated signal whose frequency, amplitude, and duty cycle is controlled by microprocessor 54. A duty cycle register stores the control values that determine the duty cycle of the signal generated at the PWM output terminal of microprocessor 54.

During operation, voltage-controlled current source 50, senses the current drawn through the LEDs and generates a control voltage signal, $V_O$, in response to the current signal level, $I_{LED}$. As mentioned before, $I_{LED}$, is the combined current flowing through all the LED branches in system 10. Control voltage signal, $V_O$, is then provided to A/D converter 52, which in turn provides a digital control signal, $V_{OD}$, corresponding to control voltage signal, $V_O$. It is noted that many commercially available microprocessors include available A/D converters. Furthermore, some processors employ time-multiplexed arrangements so that each available A/D converter is configured to receive and convert many analog signals at the same time. Thus, in one embodiment of the present invention, control voltage signal, $V_O$, may be provided to an input terminal of a time-multiplexed A/D converter of microprocessor 54.

Microprocessor 54 is programmed to generate a pulse-width modulated signal, having a duty cycle that corresponds to the level of the digital control signal generated by A/D converter 52. The duty cycle register stores a binary value representing the control signal level, $V_O$. In one embodiment of the invention, as explained in more detail below, the duty cycle of the pulse-width modulated signal is determined by the value of the number stored in the duty cycle register.

The pulse-width modulated signal in turn controls the current signal level generated by voltage-controlled current source 50, so as to maintain a desired current flow through the LEDs. For example, in one embodiment of the present invention, voltage controlled current source 50 maintains a substantially constant current flow through the LEDs.

Figure 4:
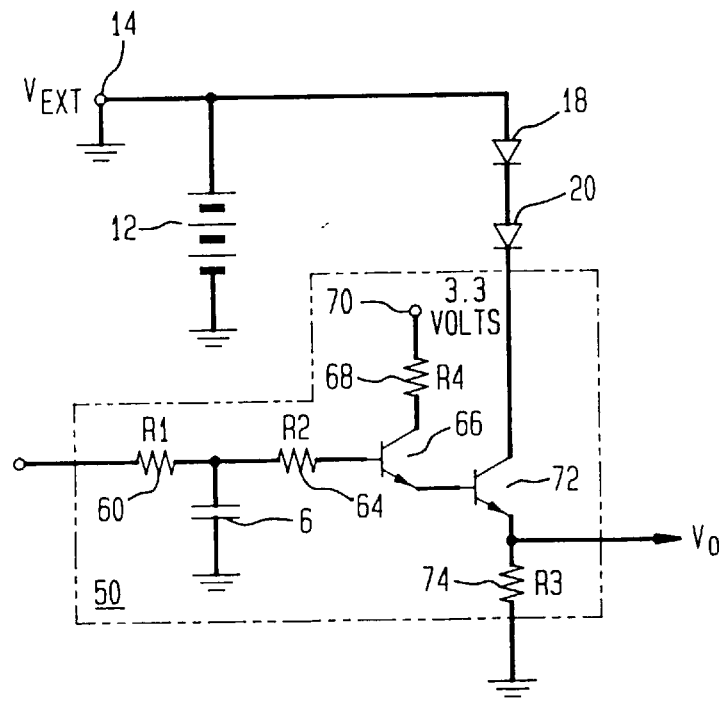
FIG. 4 illustrates a schematic diagram of the LED drive circuit of FIG. 3 in accordance with one embodiment of the present invention.

FIG. 4 is a schematic diagram of an embodiment of the present invention that illustrates in more detail the arrangement of voltage controlled current source 50. The cathode terminal of the last LED in each branch, such as 72 is coupled to the collector terminal of transistor 72. The emitter terminal of transistor 72 is coupled to ground via a resistor 74. The voltage signal across resistor 74 corresponds to the current signal, $I_{LED}$. A low pass filter circuit comprising resistors 60 and 64 and capacitor 62, is coupled to transistor 72 via a buffer transistor 66. The collector terminal of transistor 66 is coupled to a voltage power supply signal of about 3.3 volts at terminal 70.

In one embodiment of the present invention, the frequency of the pulse-width modulated signal generated by microprocessor 54 is about 9.6 KHz. As a result, the low pass filter circuit is arranged to provide a substantially DC signal to transistors 66 and 72 in response to the 9.6 KHz signal. For this embodiment, typical values for resistor 60 and 64 are 49.9 Kohms and 10 Kohms respectively. The capacitance of capacitor 62 is about 0.1 $\mu$F.

The resistance of resistor 74 is about 2 ohms. Thus, transistor 66 is employed as a buffer to provide a substantially high impedance load to the filter circuit. Otherwise, the filter circuit may experience an additional low impedance load due to transistor 72 leading to less than satisfactory LED illumination. For example, the pulse width modulated signal may not be filtered properly causing LED flickers.

The desired voltage signal, $V_O$, is a function of at least the current signal, $I_{LED}$, and the resistance of resistor 74. The value of the current signal depends at least on the number and type of the LEDs employed in the system and also on the required current flow necessary to provide a desired brightness in each LED. For example for a six branch system, wherein each branch requires a current level of about 9–10 mA, the total required current signal, $I_{LED}$, is about 54–60 mA. The value of resistor 74 is selected so that the voltage across it corresponds to an appropriate value detectable by A/D converter 52. For example, for an A/D converter with a resolution of 8 mV per bit, a voltage signal level of about 120 mV is appropriate for a reliable detection. Thus the resistance of resistor 74 is preferably set to 2 ohms. To this end, microprocessor 54 compares the value of the digital signal generated by A/D converter 52 with a given binary number that represents 120 mV.

Figure 5:
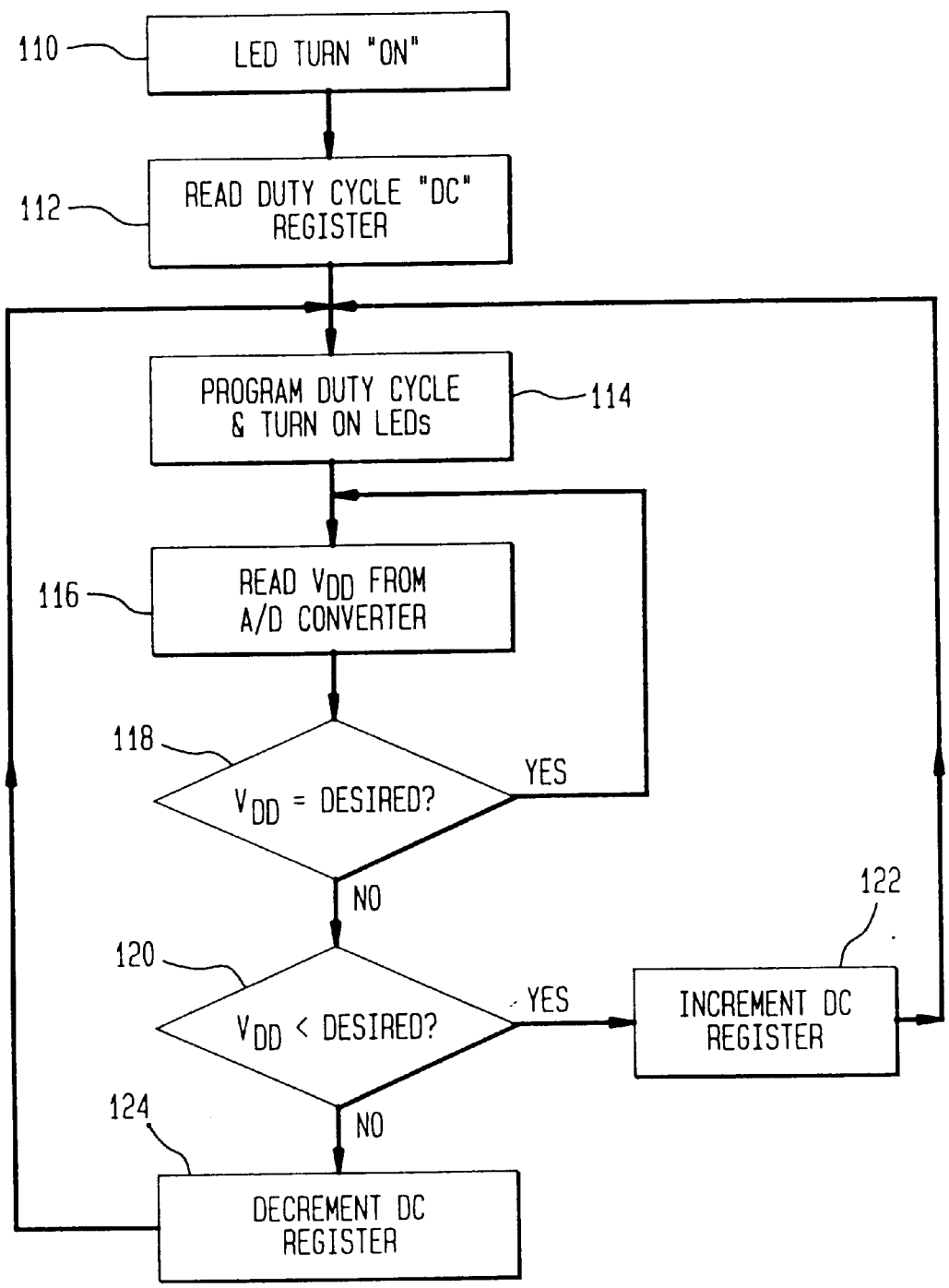
FIGS. 5 and 6 is a flow chart describing the control operation of the LED drive circuit in accordance with one embodiment of the invention.

FIG. 5 is a flow chart describing the control operation of LED drive system 10 when it is turned "on." Thus at step 110, the system begins the operation. At step 112, microprocessor 54 reads the control value stored at the duty cycle register in order to generate a signal having the appropriate duty cycle. At step 114, microprocessor 54 generates the signal with the programmed duty cycle. Transistors 66 and 72 turn "on" and a current signal begins flowing through the LEDs. At step 116, microprocessor 54 receives the voltage signal, $V_{OD}$, and at step 118 it compares this value with the desired value. For example, as mentioned before, in one embodiment of the invention, this desired value is a binary equivalent of 120 mV.

If the voltage signal, $V_{OD}$, is substantially equal to the desired value, microprocessor 54 goes back to step 114. Otherwise, microprocessor 54 goes to decision step 120 to determine whether voltage signal, $V_{OD}$, is less than the desired value. If so, microprocessor 54 goes to step 122 and increments the value of duty cycle register so that the signal generated by microprocessor 54 has an increased duty cycle. The microprocessor then goes to step 114. If, however, the voltage signal, $V_{OD}$, is more than the desired value, microprocessor 54 goes to step 124 and decrements that value of duty cycle register so that the signal generated by microprocessor 54 has a decreased duty cycle. Thereafter, microprocessor 54 goes to step 114. Microprocessor continues the above explained operation until it receives a turn "off" signal.

Figure 6:
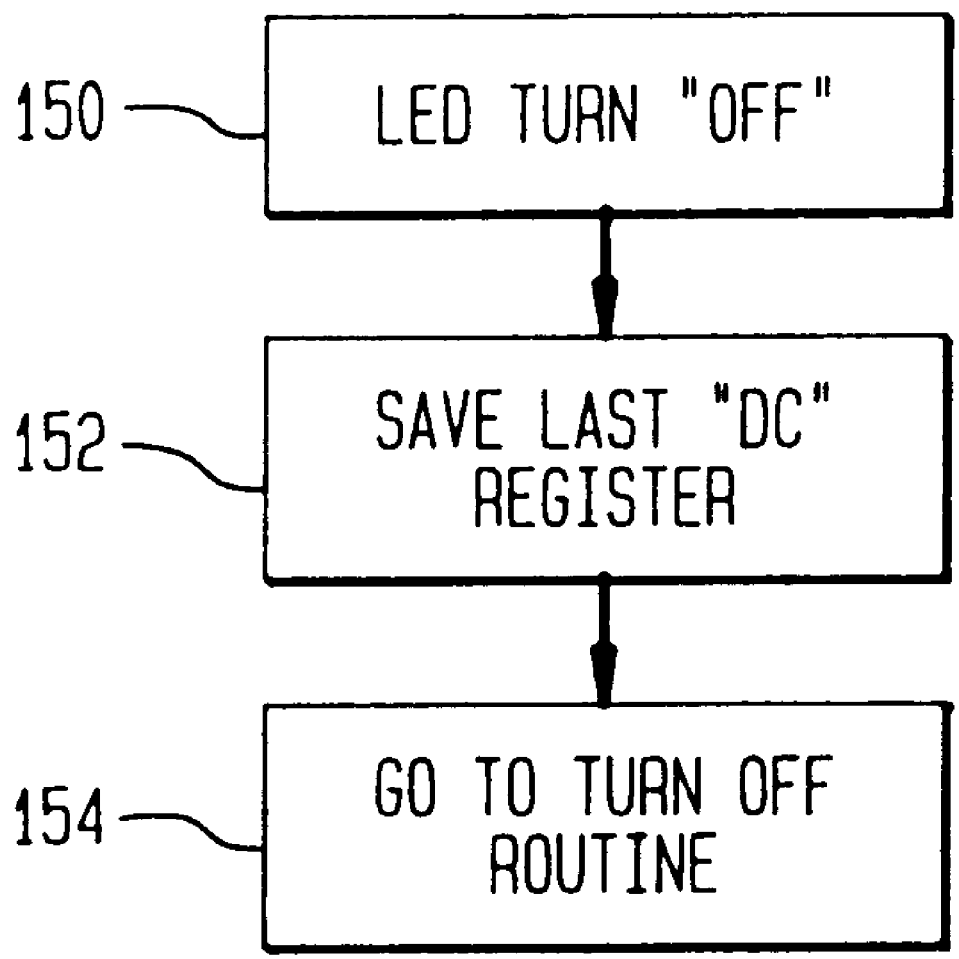

As explained in FIG. 6, during the turn "off" microprocessor 54 goes to step 152 and saves the last value of the duty cycle register and thereafter goes to the turn "off"

routine at step 154. In accordance with one embodiment of the invention, this turn "off" routine may be a process wherein the LEDs' brightness fades out gradually, or it may be a process wherein the LEDs turn "off" instantaneously, although the invention is not limited in scope in that respect.

It is noted that microprocessor 54 can also be programmed so that it is possible to provide a variable current signal to the LEDs. As such it would be possible to control the brightness level of the LEDs as desired. The use of the microprocessor allows for many other features as desired.

Thus in accordance with the present invention, an LED drive system is provided, which is capable of maintaining the current flow through the LEDs at a substantially constant level, regardless of fluctuations in the power source. Furthermore, the LED drive system allows for an efficient brightness control of the LEDs.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

I claim:

1. An LED drive circuit comprising:
   a plurality of LEDs coupled together in parallel, said LEDs configured to be powered by a battery;
   a current source coupled to said LEDs, said current source providing a current signal level for driving said LEDs;
   a current sensor circuit coupled to said current source and configured to provide a first indication signal in response to the current signal flowing in said LEDs;
   a controller circuit coupled to said current sensor so as to receive said indication signal, said controller circuit further coupled to said current source so as to provide an appropriate voltage control signal to said current source so that the current drawn through said LEDs remains substantially at a desired level.

2. The invention in accordance with claim 1, wherein said controller circuit compares said indication signal with a given value, and generates a pulse width modulated signal so as to control the current in said voltage-controlled current source.

3. The invention in accordance with claim 2, wherein the duty cycle of said pulse width modulated signal corresponds to the value of said indication signal.

4. The invention in accordance with claim 3, wherein the current drawn through said LEDs remains substantially at a constant level.

5. The invention in accordance with claim 1, wherein said voltage-controlled current source further comprises a first transistor having a collector terminal coupled to said LEDs, and an emitter terminal coupled to ground via a resistor, and a base terminal coupled to said control signal.

6. The invention in accordance with claim 5, further comprising an analog to digital converter configured to receive said indication signal and generate a corresponding binary signal, said controller further configured to receive said binary signal.

7. The invention in accordance with claim 6, wherein said voltage-controlled current source further comprises a second buffer transistor having an emitter terminal coupled to the base terminal of said first transistor, the base terminal of said second transistor is configured to receive said control voltage signal from said controller.

8. The invention in accordance with claim 7, wherein said control signal is a pulse-width modulated voltage signal having a variable duty cycle.

9. The invention in accordance with claim 8, wherein the duty cycle of said pulse-width modulated voltage signal corresponds to the value of said indication signal.

10. The invention in accordance with claim 9, further comprising a low pass filter circuit configured to receive said pulse-width modulated control signal and generate a corresponding DC voltage signal.

11. The invention in accordance with claim 9, wherein said indication signal is compared with a predetermined signal level, so as to generate a control signal corresponding to the difference between said indication signal and said predetermined signal level.

12. A method for driving LEDs coupled in a plurality of parallel branches, each branch having a plurality of serially coupled LEDs, said method comprising the steps of:
    sensing the current signal drawn in at least one of said branches;
    generating an indication signal in response to the level of said current signal drawn in said at least one branch;
    generating a voltage control signal corresponding to said indication signal; and
    controlling the value of the current signal drawn in said branch in response to said voltage control signal.

13. The method in accordance with claim 12 wherein said step of generating an indication signal comprises the step of generating a pulse-width modulated signal having a variable duty cycle.

14. The method in accordance with claim 13 wherein said step of generating a control signal further comprises the step of comparing said indication signal with a predetermined signal level and varying the duty cycle of said pulse-width modulated signal in response to the difference between said indication signal and said predetermined signal level.

15. The method in accordance with claim 12 wherein said step of controlling the value of current signal further comprises the step of maintaining said current signal at substantially a constant value.

16. The method in accordance with claim 12, wherein said step of controlling the value of current signal further comprises the step of varying the value of said current signal so as to vary the brightness of said LEDs.

* * * * *